Patented Apr. 22, 1952

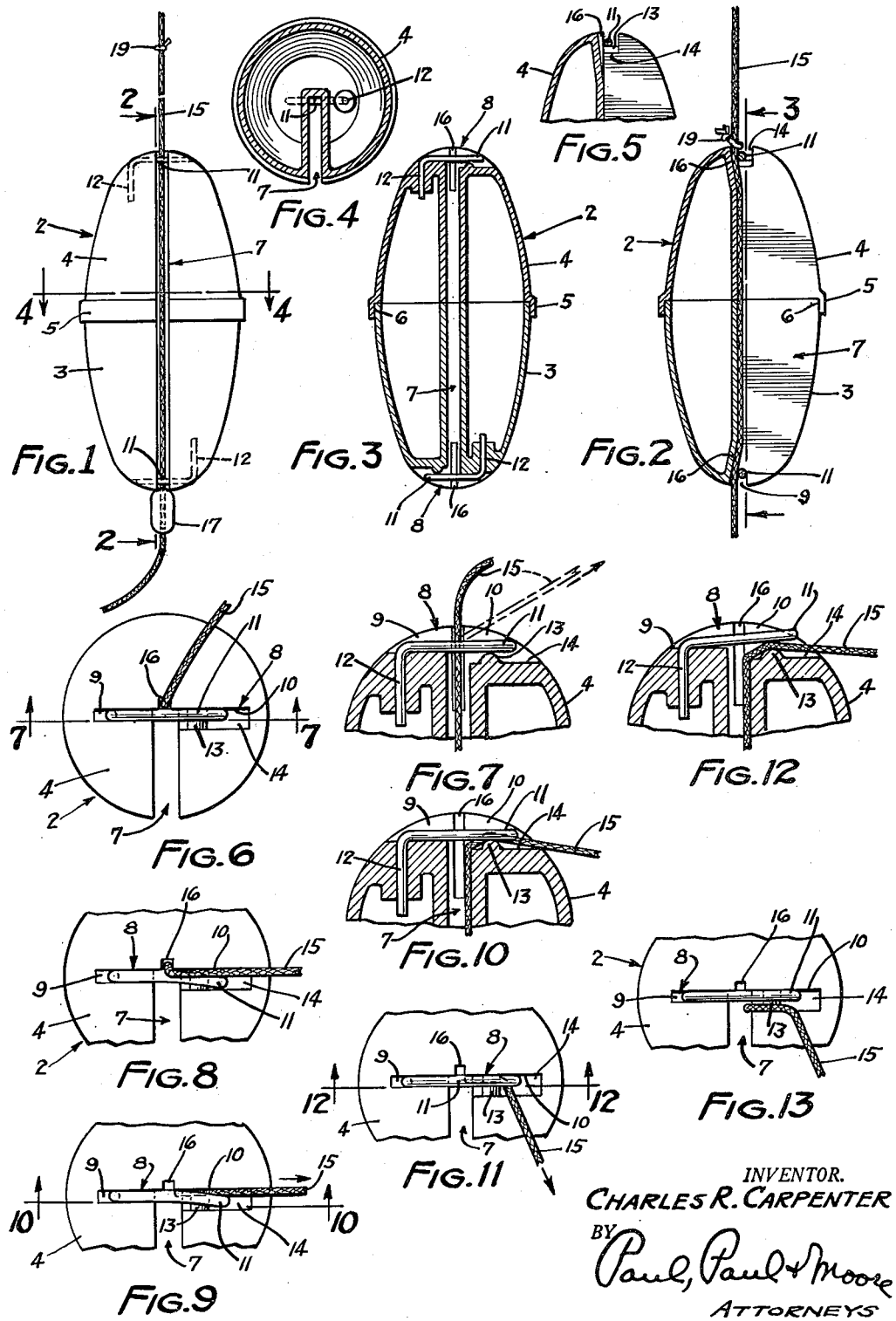

2,593,728

UNITED STATES PATENT OFFICE 2,593,728

CASTING BOBBER

Charles R. Carpenter, Robbinsdale, Minn.

Application December 18, 1947, Serial No. 792,401

5 Claims. (Cl. 43—44.91)

This invention relates to new and useful improvements in casting bobbers, and is directed more particularly to such a device which may be readily and quickly applied to a fishing line or removed therefrom.

An object of the present invention is to provide a casting bobber comprising a buoyant body or float having an open slot therein extending from end to end of the bobber, and having its bottom disposed adjacent to the axis of the bobber, and one end of said body having a transverse slot or recess therein disposed preferably at right angles to the longitudinally extending slot in said body, and a resilient or spring-actuated finger being fixed in the bottom of said transversely disposed slot and having its movable end adapted to engage a portion of the bottom of said slot, said resilient element or finger being so positioned as to retain a fishing line in position in the main slot of the bobber whereby the bobber may freely slide along the line in one direction or the other, the free end of said resilient finger being spaced from the bottom of the slot whereby the fishing line may readily be pulled under the resilient finger to the opposite side thereof, thereby to free the bobber from the fishing line.

A further object is to provide a casting bobber preferably made of plastic material and having a longitudinally extending slot in its body which extends inwardly from the periphery of the bobber to a point just beyond the axis of the bobber, a relatively smaller slot being provided at one end of said body and disposed in crosswise relation to the longitudinally extending slot and intersecting said main slot adjacent to its bottom, one end of said transversely disposed slot being wider than its opposite end, and a resilient wire-like finger having one end anchored in the bottom of one end of said transverse slot and having its opposite or resilient end disposed in the opposite end of said slot and normally engaging a raised portion in the bottom of the slot, the resilient finger being so mounted in said transverse slot that a fishing line may readily be pulled under and between the resilient finger and said raised bottom portion, thereby to slidably mount the bobber on the fishing line or to detach it therefrom, said resilient finger slidably supporting the bobber upon the fishing line whereby it is not likely to become accidentally detached therefrom when the device is in use.

Other objects of the invention reside in the unique construction of the body of the structure which preferably is molded from a suitable plastic material and is made in two halves having interfitting ends whereby the two body halves may be united to form a composite body which will be highly buoyant in the water and which presents the utmost in attractiveness and appearance whereby it may readily be noted when floating on the surface of the water; in the provision and arrangement of the resilient fingers in the bottoms of the terminal slots which serve to slidably retain the bobber upon the fishing line whereby it may readily slide back and forth thereon between the usual limit stops provided on the line without any danger of the casting bobber accidentally becoming detached from the line, even under the most strenuous use; and in the provision of such a fishing bobber which may be manufactured in quantity production at extremely low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevational view showing my improved casting bobber positioned on a fishing line;

Figure 2 is a vertical sectional view on the line 2—2 of Figure 1, showing the terminal slots or recesses provided at the ends of the main longitudinally extending slot for permitting the fishing line to pass the resilient fingers provided at the ends of the bobber;

Figure 3 is a vertical sectional view on the line 3—3 of Figure 2 showing the preferred construction of the bobber;

Figure 4 is a sectional plan view on the line 4—4 of Figure 1;

Figure 5 is a fragmentary view of the upper or one end of the bobber to show the general construction thereof;

Figure 6 is a top plan view of Figure 1 on a slightly larger scale;

Figure 7 is a detail sectional view on the line 7—7 of Figure 6;

Figure 8 is a view similar to Figure 6 showing the resilient finger flexed in the initial operation of pulling the fishing line thereunder;

Figure 9 is a view showing the fishing line pulled downwardly into the transverse slot under the resilient finger;

Figure 10 is a detail sectional view on the line 10—10 of Figure 9;

Figure 11 is a view similar to Figure 9 showing the next step in releasing the fishing line from the bobber;

Figure 12 is a detail sectional view on the line 12—12 of Figure 11, showing the fishing line being pulled between the resilient finger and the bead provided in the bottom of the transversely disposed slot; and Figure 13 illustrates the fishing line pulled clear of the resilient finger whereby the bobber may readily be removed therefrom.

The novel bobber herein disclosed is shown comprising a hollow body, generally designated by the numeral 2, comprising male and female body portions 3 and 4. The part 4 is shown provided with a flange 5 having a bore 6 therein for receiving the adjacent end of the male section 3 of the body 2, as clearly illustrated in Figure 3. The parts are bonded together in leakproof relation to provide a composite buoyant body.

The two body sections 3 and 4 are longitudinally slotted to provide an elongated main slot 7 which extends inwardly from the periphery of the bobber to a point just beyond the axis thereof and extends from end to end of the bobber.

A transversely disposed terminal slot 8 is provided at each end of the body 2, and said slots are disposed preferably in right angular relation to the main slot 7, as best illustrated in Figure 6. The end portion 9 of each slot 8 is comparatively narrow and is adapted to receive one end of a resilient finger 11 which is suitably anchored in the bottom of the slot end 9, as clearly illustrated at 12 in Figures 7, 10 and 12.

The opposite or free end 11 of the resilient finger is normally seated against a small raised bead 13 provided at the bottom of the relatively wider end 14 of each slot 8, as clearly illustrated in Figure 7. The tension in the resilient fingers 11 is such that said fingers will always be retained in engagement with their respective beads 13, as shown in Figure 3, thereby to positively prevent the bobber from becoming detached from the fishing line when in use.

It will be noted by reference to Figure 7 that the end portions 14 of the terminal slots 8, in addition to being relatively wider than the end portions 9 of said slots, are relatively deeper than the end portions 9. This is necessitated because of the provision of the beads 13, which, it will be noted by reference to Figures 7, 10 and 12, are so positioned with respect to the axis of the bobber that the terminals of the resilient fingers 11 extend well beyond the beads 13.

This is an important feature of the invention in that it makes it possible to pull or thread the fishing line 15 under the resilient fingers 11 to mount the bobber on the fishing line or to remove it therefrom.

Referring to Figures 2, 6, 8 and 9, it will be noted that the bottom of the main slot is provided at each end with a recessed portion 16, the depth of which at the end of the bobber is equal to or slightly more than the diameter of the fishing line. The bottoms of the recesses 16 are shown tapering inwardly from the ends of the bobber to thereby merge with the bottom wall of the main slot 7, as shown in Figures 2 and 5.

To mount the bobber upon the fishing line, the bobber is fitted onto the fishing line with the latter being received in the main slot 7 as shown in Figure 1. The fishing line is then pulled laterally to one side, as shown in Figure 12, whereby the line will flex the free end of the resilient finger 11, as shown in Figures 8 and 9, whereby it may pass between the finger 11 and the side wall 10 of the slot 8, and thence under the resilient finger 11, as shown in Figure 12, whereupon the line is freed from the recess 16 and resilient finger 11 to thereby release the bobber. It will thus be seen that the bobber may be readily and quickly mounted upon the fishing line or removed therefrom without the use of tools, by simply grasping the bobber with one hand and then threading the line through the slot 7 and under the resilient fingers 11 at the ends of the bobber, into the recesses 16, as herein shown and described. The bobber is free to slide on the fishing line between the usual sinker 17, secured to the fishing line adjacent to the usual bait or hook, not shown, and a slip knot 19 tied to the fishing line above the bobber 2, as will readily be understood by reference to Figures 1 and 3.

The novel casting bobber herein disclosed may be formed of any suitable material applicable for the purpose. It readily lends itself for manufacture from plastic material whereby it may be made in large quantities at extremely low cost. Such material also provides a very neat and attractive looking device which may be made in different colors as, for example, the upper portion of the bobber may be red and its lower portion white, or any other color combinations may be used which are clearly visible when the bobber floats upon the surface of the water. When the bobber is used on a fishing line, it retains a position adjacent to the sinker 17 during the casting operation, as shown in Figure 1, and when the hook and bobber strike the surface of the water, the sinker 17 causes the line to run through the floating bobber 2 until the slip knot 19 engages the upper end of the bobber or float, as shown in Figure 2. The position of the knot 19 upon the line relative to the sinker 17 will determine the depth at which the hook will be suspended in the water. The size of the knot is such that it may readily pass through the usual terminal eye of a fishing rod without difficulty, and without in any way interferring with the operation of the reel upon which the line may be wound.

The novel casting bobber hereindisclosed has been found extremely practical in actual operation. The arrangement of the resilient fingers 11 and terminal slots 8 at the ends of the bobber, is such that the fishing line may be quickly threaded around the resilient ends of the fingers 11 in the operation of mounting the bobber on the line or detaching it therefrom without the use of separate tools or the like, which is a highly desirable feature in a device of this general type. The knot 19 is tied around the fishing line in any suitable manner whereby it will frictionally retain its position upon the fishing line when adjustably shifted from one place to another on the line to vary the position of the hook relative to the surface of the water.

The reduced recesses 16 at the ends of the body 2 cooperate with the resilient fingers 11 to provide restricted guideways for the line 15, as best shown in Figures 2 and 6, whereby the knot 19 cannot enter the main slot 7 of the body 2.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A casting bobber comprising a body provided with a longitudinally extending main slot extending inwardly from the periphery of said body to a point adjacent to its axis adapted to receive a conventional fishing line, said body having a terminal slot at each end thereof disposed at substantially right angles to said main slot, and a resilient finger mounted in each terminal slot, said resilient fingers traversing the main slot at its ends and having their free ends normally engaging the tops of raised portions in the bottoms of their respective terminal slots, said fingers retaining the bobber on the fishing line during casting operations for free slidable movement thereon.

2. A casting bobber comprising an elongated body having a main slot extending from end to end thereof and to a depth of at least one half the diameter of said body, said main slot being adapted to have a fishing line threaded therethrough, said body having a terminal slot at each end thereof disposed at substantially right angles to the main slot, each terminal slot having a wire element anchored to the bottom thereof, and said wire elements each having a resilient end portion intersecting said main slot adjacent to its ends and cooperating to retain the bobber on the fishing line during casting operations, and means in said terminal slots to facilitate threading the fishing line around said resilient end portions in the operation of mounting the bobber upon the line.

3. A casting bobber comprising an elongated hollow body having a main slot extending from end to end thereof and to a depth of at least one-half the diameter of said body, said main slot being adapted to have a fishing line threaded therethrough, said body having a terminal slot at each end thereof disposed at substantially right angles to the main slot, and a wire element constituting a resilient finger disposed in each terminal slot, each resilient finger having one end anchored to the bottom wall of its respective terminal slot adjacent to one end thereof, and the opposite ends of said resilient fingers being received in the opposite ends of said terminal slots and engaging raised bead-like portions provided in the bottoms of said terminal slots, said raised portions being located inwardly of the ends of said resilient fingers, thereby to facilitate threading a fishing line around the ends of the resilient fingers into or out of the main slot in said body.

4. A casting bobber comprising an elongated hollow body having a main slot extending from end to end thereof and to a depth of at least one-half the diameter of said body, said main slot being adapted to have a fishing line threaded therethrough, said body having a terminal slot at each end thereof disposed at substantially right angles to the main slot, and a wire element constituting a resilient finger disposed in each terminal slot, each resilient finger having one end anchored to the bottom wall of its respective terminal slot adjacent to one end thereof, and the opposite ends of said resilient fingers being received in the opposite ends of said terminal slots and engaging raised bead-like portions provided in the bottoms of said terminal slots, said raised portions being located inwardly of the ends of said resilient fingers, thereby to facilitate threading a fishing line around the ends of the resilient fingers into or out of the main slot in said body, and the bottom wall of the main slot having a recess at each end thereof cooperating with said resilient fingers to provide restricted guideways for the line at the ends of the bobber.

5. A casting bobber comprising an elongated hollow body having a main slot extending from end to end thereof and to a depth of at least one-half the diameter of said body, said body having a terminal slot at each end thereof disposed at substantially right angles to the main slot, and a resilient wire element disposed in each terminal slot and each having one end anchored in said slot with its opposite end intersecting the main slot, each resilient wire element having an end portion normally engaging a wall of its associated terminal slot and arranged to be flexed out of engagement with said wall to permit a fishing line to be threaded under the flexible end portions of said resilient wire elements into the main slot whereby said resilient wire elements will cooperate to inseparably secure the bobber to the fishing line for free sliding movement thereon.

CHARLES R. CARPENTER.

REFERENCES CITED

The following references are of record in the file of this patent:

UNITED STATES PATENTS

| Number | Name | Date |
|---|---|---|
| 522,167 | Rawlings | June 26, 1894 |
| 992,341 | Davis | May 16, 1911 |
| 1,371,188 | Wells | Mar. 8, 1921 |
| 2,001,241 | DeVries | May 14, 1935 |
| 2,106,618 | Mehaffey | Jan. 25, 1938 |